United States Patent
Germain et al.

(10) Patent No.: US 9,929,563 B2
(45) Date of Patent: Mar. 27, 2018

(54) SUBSEA CABLE ENGAGEMENT SYSTEM

(71) Applicant: Tidal Generation Limited, Stafford, Staffordshire (GB)

(72) Inventors: Christopher Germain, Bristol (GB); James Sheppard, Bristol (GB); Richard Goss, Bristol (GB)

(73) Assignee: TIDAL GENERATION LIMITED, Staffordshire (GB)

( * ) Notice: Subject to any disclaimer, the term of this patent is extended or adjusted under 35 U.S.C. 154(b) by 0 days.

(21) Appl. No.: 15/038,318

(22) PCT Filed: Oct. 21, 2014

(86) PCT No.: PCT/GB2014/053139
§ 371 (c)(1),
(2) Date: May 20, 2016

(87) PCT Pub. No.: WO2015/075419
PCT Pub. Date: May 28, 2015

(65) Prior Publication Data
US 2016/0301212 A1     Oct. 13, 2016

(30) Foreign Application Priority Data
Nov. 22, 2013   (GB) .................................. 1320655.2

(51) Int. Cl.
*H02J 3/38* (2006.01)
*F03B 13/14* (2006.01)
(Continued)

(52) U.S. Cl.
CPC ............... *H02J 3/38* (2013.01); *F03B 11/00* (2013.01); *F03B 13/14* (2013.01); *F03B 13/26* (2013.01);
(Continued)

(58) Field of Classification Search
CPC .................................................. H01R 13/523
See application file for complete search history.

(56) References Cited

U.S. PATENT DOCUMENTS 3,665,509 A * 5/1972 Elkins .................. H01R 13/523
                                                                  439/271
4,075,862 A * 2/1978 Ames .................... E21B 43/013
                                                                  166/343
(Continued)

FOREIGN PATENT DOCUMENTS

EP   2 722 948 A1   4/2014
GB   1 308 247 A    2/1973
(Continued)

OTHER PUBLICATIONS

"Engineering and technologies MQC Stab Plate & VTA". Jun. 30, 2013 (Jun. 30, 2013). XP055181836. Retrieved from the Internet: URL: http://www.technip.com/sites/default/files/technip/fields/duco_stab_plate.pdf on Apr. 9, 2015.
(Continued)

*Primary Examiner* — Robert J Hoffberg
(74) *Attorney, Agent, or Firm* — Douglas D. Zhang; GE Global Patent Operation

(57) ABSTRACT

A subsea cable engagement system for connecting at least one cable end connector in communication with a power generation unit to a hub mounted cable connector of a hub. The system comprises a base; and at least one hub. The base comprises an engagement section for receiving a hub(s); and at least one engagement member for engaging a cable-end connector. The hub(s) comprises at least one hub-mounted cable connectors. The engagement member(s) of the base and/or the at least one hub-mounted cable connector are arranged to provide relative movement therebetween for (Continued)

engagement of at least one cable-end connector with at least one hub-mounted cable connector.

16 Claims, 11 Drawing Sheets

(51) Int. Cl.
  *F03B 13/26* (2006.01)
  *H01R 13/523* (2006.01)
  *H01R 13/629* (2006.01)
  *H02G 9/02* (2006.01)
  *F03B 11/00* (2006.01)

(52) U.S. Cl.
  CPC ......... *H01R 13/523* (2013.01); *H01R 13/629* (2013.01); *H02G 9/02* (2013.01); *Y02E 10/226* (2013.01); *Y02E 10/38* (2013.01)

(56) References Cited

U.S. PATENT DOCUMENTS

| | | | | |
|---|---|---|---|---|
| 5,255,744 | A * | 10/1993 | Silva | E21B 43/017 166/347 |
| 6,742,963 | B2 | 6/2004 | Bekkevold | F16L 1/26 405/158 |
| 7,600,569 | B2 * | 10/2009 | Routeau | E21B 43/0135 166/344 |
| 7,980,149 | B2 * | 7/2011 | Godfrey | B01L 9/527 422/544 |
| 9,108,747 | B2 * | 8/2015 | Roberts | B64G 4/00 |
| 9,347,424 | B2 * | 5/2016 | Vigars | F03B 11/00 |
| 2009/0045631 | A1 * | 2/2009 | Gibberd | F03B 13/264 290/53 |
| 2014/0318117 | A1 * | 10/2014 | Vigars | F03B 13/264 60/497 |
| 2016/0052604 | A1 * | 2/2016 | Taylor | B63B 21/50 114/230.26 |
| 2016/0218461 | A1 * | 7/2016 | Petie | H01R 13/523 |
| 2016/0318591 | A1 * | 11/2016 | Jamieson | H02J 7/025 |
| 2017/0187143 | A1 * | 6/2017 | Vassgård | H01R 13/523 |

FOREIGN PATENT DOCUMENTS

| | | |
|---|---|---|
| GB | 2 318 373 A | 4/1998 |
| GB | 2501249 A | 10/2013 |
| JP | 2002-152959 A | 5/2002 |
| JP | 2003-304629 A | 10/2003 |
| WO | 0179736 A1 | 10/2001 |
| WO | 2012/153107 A1 | 11/2012 |
| WO | 2013092686 A1 | 6/2013 |

OTHER PUBLICATIONS

A International Search Report and Written Opinion issued in connection with corresponding Application No. PCT/GB2014/053139 dated May 13, 2015.

Combined Search and Examination Report issued in connection with corresponding GB Application No. 1320655.2 dated Jun. 6, 2014.

First Office Action and Search issued in connection with corresponding CN Application No. 201480073920.4 dated Jun. 13, 2017.

* cited by examiner

SUBSEA CABLE ENGAGEMENT SYSTEM

The present invention relates to a subsea cable engagement system for providing engagement between at least one cable-end connector in communication with a power generation unit and at least one hub-mounted cable connector for water power generation systems, such as for example water current power generation systems, water power generation systems, wave power generation systems and tidal power generation systems, and to methods for connecting at least one cable-end connector of a power generation unit to a hub-mounted cable connector of at least one hub.

BACKGROUND OF THE INVENTION

It is widely known that easily accessible resources of fossil fuels are declining. In addition, the impact of the use of fossil fuels upon the environment has become increasingly apparent. As a result of this, it has become imperative that viable alternative energy sources are used as effectively and efficiently as possible. The use of turbines to capture the power of water flow, such as tidal, river and ocean current flows is becoming a viable source of alternative energy. The turbine equipment used to capture such water flow energy typically includes a shaft driven generator connected using a drivetrain to a rotor assembly. The rotor assembly includes a plurality of rotor blades that are driven by the water flow, so as to turn an input shaft of the drivetrain.

The turbine systems are typically deployed in multiple numbers at a particular location. Conventional systems comprise a hub which collects power from the multiple turbines and exports the power to shore via an export cable. Each turbine is arranged on a spur circuit from the hub. There might be multiple turbines on each spur circuit. The hub may be connected in a ring circuit with other hubs. The hub may export the power to shore at a higher voltage. It is estimated that the cables, which are necessarily located in regions of high tidal flow and/or large waves, have an estimated Mean Time Between Failure of approx. 5 years. The typical design lifetime of a turbine system is in the range of between 25 and 30 years. Therefore, it is likely that the cables will need to be replaced frequently during the lifetime of the hub and turbine. Dynamically positioned (DP) offshore construction vessels are typically required in order to replace damaged cables. The use of such vessels is however extremely expensive, so any system that reduces the time required to complete the replacement of damaged cables will significantly reduce costs and therefore improve the economic viability of the power generation system. Furthermore, if during replacement of a damaged cable, the other turbines are out of operation having further economic implications. In order to replace a damaged cable of one example of a conventional subsea power generation system with a hub, the whole hub complete with attached cables needs to be raised to the sea surface for intervention. This requires significantly more vessel time than the present invention, exposes the system to greater risk of further cable damage, requires large loops of excess cable to be arranged on the seabed and requires that all the power generation devices attached to the hub are inoperable for the duration of the operation. In order to replace cable(s) of another example of a conventional turbine system, the hub needs to be removed first. As the other turbines connected to the hub are unable to operate until the faulty cable and the hub have been replaced, the process of replacing the damaged cable loses more revenue for the operator than a single cable fault should warrant. Other known systems comprise a removable hub which does not need to be removed in order to replace faulty cables (as disclosed in GB2501249). However, this system does require the presence of twice the number of wetmate connectors compared to the present invention.

SUMMARY OF THE INVENTION

According to one aspect of the present invention, there is provided a subsea cable engagement system for connecting at least one cable-end connector in communication with a power generation unit to a hub-mounted cable connector of a hub, comprising:
a base comprising an engagement section for receiving a hub; and at least one engagement member for engaging a cable-end connector; and at least one hub comprising at least one hub-mounted cable connector; in which the engagement member(s) of the base and/or the at least one hub-mounted cable connector are arranged to provide relative movement therebetween for engagement of at least one cable-end connector located within the engagement member(s) of the base with at least one hub-mounted cable connector.

According to a second aspect, the present invention provides a method for engaging at least one cable-end connector in communication with a power generation unit to at least one hub-mounted connector of a hub using a subsea cable engagement system as herein described, the method comprising:
engaging at least one cable-end connector with at least one engagement member of the base;
engaging the engagement section of the base with the at least one hub; and providing relative movement between the engagement member(s) of the base and/or the at least one of hub-mounted cable connector to engage the at least one cable-end connector with the at least one hub mounted cable connector of the hub(s).

According to a further aspect, the present invention provides a method for disengaging at least one cable-end connector in communication with a power generation unit from at least one hub-mounted connector of at least one hub using a subsea system as herein described, comprising:
providing the at least one actuation mechanism to provide relative movement between the engagement member(s) of the base and the at least one hub-mounted cable connector to disengage the cable-end connector(s) from the hub-mounted connector(s).

The system of the present invention reduces the number of connections, for example wetmate connections, needed to be made between the cables associated with each separate power generation unit, such as for example tidal turbines, and the hub compared to conventional subsea cable engagement systems, such as for example the system disclosed in GB2501249.

The system may further comprise at least one actuation means for providing relative movement between the engagement member(s) of the base and/or the at least one of hub-mounted cable connector to engage the at least one cable-end connector with the at least one hub mounted cable connector of the hub(s).

The relative movement between the engagement member(s) of the base and/or the at least one of hub-mounted cable connector may be provided by an ROV (Remotely Operated Vehicle) The ROV may be operated to move the engagement member(s) of the base and/or the at least one of hub-mounted cable connector in order to engage the at least one cable-end connector with the at least one hub mounted cable connector of the hub(s).

The at least one hub-mounted cable connector may be provided by at least one stab plate(s).

The system may comprise at least one clamp arranged to clamp the at least one hub to the base. In an embodiment, the system is arranged such that the cable-end connectors are located external to the clamp(s). The clamp may be provided by at least one hub. The clamp may be provided by the base. The clamp may be operable by an ROV or diver. The clamp may be operable by "onboard" systems or external temporarily deployed systems, such as for example a removable winch or other suitable tools. The cable-end connectors and/or cables can therefore be easily accessed without compromising the clamp(s) or the hub(s). The system of the present invention enables individual cables and/or cable-end connectors to be replaced without needing to remove the hub(s) from the base. Furthermore, the system of the present invention significantly reduces the part count as each connector directly connects the cable and the subsea hub stab plate. The system enables the rest of the turbines connected to the hub(s) to be in operation while a single turbine is out of operation while the problem is fixed. The system enables the cables to be fixed or replaced without requiring the hub(s) to be removed. The system of the present invention therefore provides significant cost savings for cable retrieval, repair and/or deployment.

The power generation unit may for example be a water current turbine or a wave powered device.

The hub(s) typically comprise electrical equipment such as for example isolators, circuit breakers, frequency converters, other power electronic devices, transformers, switches, and busbars.

In an embodiment, the at least one actuation mechanism is arranged to displace the stab plate(s) of the hub in a direction towards and/or away from the at least one engagement member of the base. The at least one actuation mechanism may be arranged to rotate the stab plate(s) relative to the hub. The at least one actuation mechanism may be arranged to swing the stab plate(s) relative to the hub. The displacement of the stab plate(s) so as to move the hub mounted cable connector(s) and/or the at least one engagement member in a direction towards and/or away from each other, the rotation of the stab plate(s) relative to the hub, and swinging the stab plate(s) relative to the hub may be provided by the same actuation mechanism. Alternatively, the displacement of the stab plate(s) so as to move the hub mounted cable connector(s) and/or the at least one engagement member in a direction towards and/or away from each other, the rotation of the stab plate(s) relative to the hub, and swinging the stab plate(s) relative to the hub may be provided by two or more separate actuation mechanisms.

The system may further comprise at least one export cable connector. The system may further comprise at least one export cable mounted connector for engagement with the at least one export cable connector. In an embodiment, the at least one export cable connector(s) and/or the at least one export cable mounted connector(s) is a wetmate connector.

The system may further comprise at least one export actuation mechanism for providing relative movement between the export cable mounted connector(s) and/or the export cable connector(s) for engagement of at least one export cable mounted connector with at least one export cable connector. The system comprises a plurality of export actuation mechanisms. In an embodiment, the at least one export cable connector is provided on at least one export stab plate. For example, the system may comprise a plurality of actuation mechanisms comprising a plurality of export stab plates. Each stab plate may comprise one or more cable connectors.

The or each export cable connector may comprise individual local float and/or compliance relative to the stab plate(s). A plurality of export cable connectors may comprise collective float and/or compliance relative to the stab plate(s).

The system may comprise at least one export engagement member for receiving the at least one export cable mounted connector. Each engagement member may comprise a base portion for locating in use adjacent a bed of a river or sea; a locating feature located at or adjacent a first end of the engagement member; and at least one attachment feature located at or adjacent a second opposed end of the engagement member. A first locating feature may be located at or adjacent the first end of the engagement member. A second locating feature may be located between the first and second ends of the engagement member.

The system may provide at least one export engagement member in any suitable arrangement. The arrangement may comprise any suitable number of export engagement members, corresponding to the number of export cable connectors provided.

The export stab plate(s) may comprise at least one export cable connector provided in a first arrangement. The at least one export cable mounted connector may be provided in a second arrangement. For example, the at least one export engagement members are provided in a second arrangement. The second arrangement may comprise any suitable number of export cable mounted connectors and/or export engagement members. In an embodiment, the number of export cable mounted connectors and/or export engagement members provided in the second arrangement corresponds to the number of export cable connectors provided in the first arrangement. The first arrangement and the second arrangement are complementary such that on displacement of the export cable connector(s) and/or export cable mounted connector(s) by at least one export actuation mechanism at least one, for example each export cable mounted connector is aligned and mated with an export cable connector of the hub. For example, the location of and spacings between the export cable connectors in the first arrangement substantially matches the location of and spacings between the export cable mounted connectors and/or export engagement members in the second arrangement.

The export cable connectors and/or the export cable mounted connectors and/or export engagement members may be provided in any suitable arrangement, such as for example circular arrangements or rectilinear arrangements.

The arrangement of the export cable connectors and the export cable mounted connectors and/or the export engagement members may have a degree of rotational symmetry. This arrangement allows the hub to be mounted onto the base in more than one position.

In a further embodiment, the export engagement members and/or export cable mounted connectors are located outboard of the vertical projection of the hub.

The or each export cable mounted connector may be mounted within an export cable head system. A plurality of export cable mounted connectors may be mounted within a single export cable head system. For example, the different cores of an export cable may be split out to separate export cable mounted connectors within a single export cable head system. For example, separate phases, communications, auxiliary power, control etc may be split out to separate export cable mounted connectors within a single export cable head system.

The export cable mounted connector(s) within an export cable head system may comprise individual local float and/or compliance relative to the export cable head system.

A plurality of export cable mounted connectors mounted within an export cable head system may comprise collective float and/or compliance relative to the export cable head system.

The export cable mounted connector(s) may be mounted within an export cable head system on one or more export cable connector mountings. The export cable connector mounting(s) may be located within one or more recesses provided by the export cable head system in order to protect against any accidental damage to the mounting from external factors.

In an embodiment, the export cable head system is sealed from water ingress. Alternatively, the export cable head system may provide a plurality of fill and drain openings to allow flooding of the export cable head system. The export cable head system may comprise a frame in which the export cable mounted connector(s) is mounted.

In an embodiment, the at least one export engagement member and the export cable mounted connector(s), or export cable head system(s) comprising the export cable mounted connector(s), comprise engagement features to releasably engage each other. The export engagement member(s) comprises at least one engagement feature for releasable engagement with the export cable mounted connector(s) or export cable head system(s). The engagement features may be any suitable combination of engagement features to provide releasable engagement between the export engagement member(s) and the export cable mounted connector or export cable head system comprising the export cable mounted connector.

More particularly, the export engagement member(s) and/or export cable mounted and/or export cable head system are located outboard of a clamp.

The export cable head system(s) may comprise at least one appurtenance for aiding lifting/lowering; alignment with the hub mounted export cable connector; capture by for example an ROV of the export cable head system; and/or providing a holdback force to allow laying away of the corresponding cable. The export actuation mechanism(s)) may comprise local float and/or compliance in its mounting to the hub.

The hub may comprise the at least one export actuation mechanism arranged to displace the at least one export cable connector of the hub and/or the export cable mounted connector in a direction towards and/or away from each other. The hub may comprise a plurality of export actuation mechanisms. For example, the at least one export actuation mechanism may be arranged to provide vertical displacement of the export cable connector(s) of the hub towards and/or away from the at least one export cable mounted connector and/or the export engagement member(s).

The export actuation mechanism(s) may be located inboard of the vertical projection of the hub when the export cable connector(s) are disengaged from the export cable mounted connector(s). The export actuation mechanism(s) may be located outboard of the vertical projection of the hub when the export cable connector(s) are engaged with the export cable mounted connector(s). In an embodiment, the export actuation mechanism(s) retracts inboard when the export cable connectors are disconnected. The export actuation mechanism(s) is more particularly located inboard of the vertical projection of the hub in the disengaged position so that the corresponding export cable mounted connector or corresponding export cable head system comprising at least one export cable mounted connector located within the corresponding export engagement member can be lifted vertically from above when being removed/replaced. As a result, this operation does not require the hub to be removed in order to remove an export cable mounted connector.

The export actuation mechanism(s) may comprise at least one export stabbing mechanism comprising at least one export stab plate. Each export stab plate may be associated with a separate export stabbing mechanism. The export stabbing mechanism(s) may for example be a vertical stabbing mechanism. In an embodiment, the at least one export actuation mechanism is arranged to align the export cable connector(s) of the export stab plate(s) with the corresponding export cable mounted connector(s) prior to linear/axial stabbing. The at least one export actuation mechanism comprises an alignment mechanism for aligning the export stab plate(s) relative to the export cable mounted connector(s). The alignment mechanism is more particularly arranged to align the export stab plate(s) relative to the export cable mounted connector(s) by rotational movement relative to the hub.

The export actuation mechanism comprises an export stabbing mechanism to provide a connection between at least one export cable connector and at least one corresponding export cable mounted connector. The hub comprises a separate export actuation mechanism, for example a separate export stabbing mechanism, arranged to provide an export cable connector for engagement with an export cable mounted connector.

A single export actuation mechanism may be arranged to displace all of the export cable connector(s) and/or export cable mounted connector(s). Alternatively, the system may comprise a plurality of export actuation mechanisms, in which each export actuation mechanism is arranged to displace a predetermined number of export cable connector(s) and/or export cable mounted connector(s).

The at least one export actuation mechanism may be arranged to rotate the at least one export stab plate relative to the hub. The at least one export actuation mechanism may be arranged to swing the at least one export stab plate relative to the hub. The at least one export actuation mechanism arranged to displace the at least one export stab plate relative to the export cable mounted connector may also be arranged to rotate and/or the at least one export stab plate relative to the hub. Alternatively, rotation of the at least one export stab plate may be provided by a first export actuation mechanism; displacement of the at least one export stab plate may be provided by a further export actuation mechanism; and the at least one export stab plate relative to the hub may be effected by a still further export actuation mechanism.

The export actuation mechanism(s) may comprise at least one flexible cable extending from the hub. In an embodiment, the flexible cable(s) is arranged to extend between the export stab plate(s) and the hub. More particularly, the flexible cable(s) is arranged so as to be displaceable so as to displace with the export stab plate(s) comprising the export cable connector(s). The export stab plate(s) comprising the export cable connector(s) is more particularly provided at a first end of the flexible cable. The flexible cable(s) comprises a connector located at one or more of: the end arranged to engage the hub; the end arranged to engage the export cable mounted connector or export cable head system. The flexible cable(s) comprises a first connector located at the end arranged to engage the hub and a second connector located at the end arranged to engage the export cable mounted connector or export cable head system. The end of the flexible cable arranged to engage the hub comprises at least one penetrator or any other suitable connector to allow the external circuits to be brought into the dryspace of the hub. An example of a suitable connector(s) is a suitably designed bulkhead drymate connector. The end of the flexible cable arranged to engage the export cable mounted connector comprises a wetmate connector. The flexible cable may comprise any combination of suitable connectors. For example, the connectors may be one or more of drymate connectors, wetmate connectors or combinations thereof.

The export actuation mechanism(s), for example the export stabbing mechanism(s), may comprise local float and/or compliance in its mounting to the hub. The export stab plate(s) may comprise local float and/or compliance in its mounting to the hub. A plurality of export stab plates may comprise collective float and/or compliance in their mounting to the hub. The export cable connector(s) may further comprise local float and/or compliance relative to the export actuation mechanism(s), for example the export stabbing mechanism(s). The export cable connector(s) may further comprise local float and/or compliance relative to the export stab plate(s). A plurality of export cable connectors may comprise collective float and/or compliance relative to the export actuation mechanism(s), for example the export stab plate(s).

The system may further comprise at least one first export functional cap for engaging at least one export cable mounted connector. The system may further comprise at least one second export functional cap for engaging the corresponding at least one export cable connector of the export stab plate(s). The export functional caps may be blind connectors comprising all the seals and functions of an export connector. The export functional caps, when engaged to the at least one export cable mounted connector or export cable connector, prevent the connector from being exposed to the seawater. The second export functional cap(s), when engaged with the export cable connector(s) also enables the hub end of the corresponding export circuit connection to be energised at full working voltage. For example, when the system comprises two export circuit connections to arrange the hubs in a ring circuit, either or both export circuit connections can be live. One of the export circuit connections can be disconnected or isolated if there is fault on the corresponding export cable. The hub may still export on the remaining export circuit connection. As a result, a separate isolator for the export circuit connection is not required to be present within the hub. The hub and the remaining healthy turbines can therefore be operated while the damaged export cable is taken away and replaced. If the hub is connected in a ring main and the export circuit connections comprise an outboard stabbing system, the hub only needs to be switched "off" while the export connectors are disconnected and the export functional caps engaged to the corresponding export connectors. The hub can then be operated again. As a result the down time of the hub is significantly reduced compared to conventional systems.

At least one of the first and second export functional caps is provided by the export stabbing mechanism(s). For example, the first and/or second export functional caps may be part of the export stabbing mechanism(s). The first and/or second export functional caps may be positioned on the corresponding connector(s) by the export stabbing mechanism(s).

The export cable head system(s) may further comprise at least one recess for storing the first and/or second export functional caps.

When the hub mounted export cable connector is engaged with the export cable mounted connector, the export actuating mechanism(s), for example the stabbing mechanism(s), may be arranged to store the at least one first and/or second export functional caps. More particularly, the actuation mechanism(s) provides at least one recess for receiving the first and/or second export functional caps. In the engaged position, when the at least one export cable mounted connector is engaged with the corresponding export cable connector(s), the at least one first and/or second export functional caps are disengaged from the respective cable connectors.

The first and/or second export functional caps comprise engagement features for mutual engagement such that when the export stabbing mechanism(s) is in the engaged position the at least one first export functional cap engages the corresponding at least one second export functional cap. Engagement of the at least one first and second export functional caps ensures that the caps are protected from external factors while not in use.

The export cable mounted connector(s) and/or export cable head system(s) may be lowered into position by a deck mounted winch or deck crane. The export cable mounted connector(s) and/or export cable head system(s) may be maneuvered into position relative to the base by a remotely operated vehicle (ROV), a winch and/or a crane. The export cable connector(s), for example the export cable head system, may comprise at least one appurtenance for aligning with and/or engaging an ROV and/or a deck mounted winch and/or deck crane. For example, the second surface or the second side portion of the export cable head system(s) may provide at least one appurtenance for aligning with and/or engaging an ROV and/or a deck mounted winch and/or deck crane. The at least one appurtenance provided by the export cable mounted connector(s) provides for releasable engagement with an ROV and/or deck mounted winch and/or deck crane. For example, the export cable mounted connector(s), for example the export cable head system, comprises a flange for mounting at least one appurtenance for aligning with and/or engaging an ROV and/or a deck mounted winch and/or deck crane. The appurtenance(s) may be any suitable feature, such as for example a projection, opening or recess. The ROV, deck mounted winch and/or deck crane may be released from the export cable head system when the export cable head system has been approximately aligned with the corresponding export engagement member. Release of the ROV, winch and/or crane may therefore enable the export cable head system to be dropped or lowered into engagement with the corresponding export engagement member. The export cable connector(s) and/or export cable head system(s) may be lowered vertically from above using a deck mounted winch and/or deck crane. Optionally, a ROV may be used to observe and to disconnect the export connector(s) and/or export cable head system (s) from the winch and/or crane. An ROV may however be used to steer the export cable mounted connector(s) and/or export cable head system(s) to the desired location.

Embodiments for the export cable mounted connector(s), export cable connector(s) and export actuation mechanism(s) are described above. It is however to be understood that the present invention can comprise any conventional export cable mounted connector(s), export cable connector(s) and export actuation mechanism(s).

In an embodiment, the system further comprises at least one cable-end connector arranged to be received within the at least one engagement member(s). The cable-end connectors may be wetmate connectors. The wetmate connectors may be provided at a first end of a cable, the other end of the cable connects to a turbine. Each cable-end connector may be mounted within a cable head system. The system may comprise multiple different types of cable-end connectors and/or hub-mounted connectors. The system may comprise a plurality of cable head systems. One or more of the cable head systems may comprise a different type of cable-end connectors. One or each cable head system may comprise a plurality of different types of cable-end connectors.

The base may provide the plurality of engagement members in any suitable arrangement. The arrangement may comprise any suitable number of engagement members, corresponding to the number of cable-end connectors. The hub-mounted cable connectors may be provided in any suitable arrangement.

The base may comprise a plurality of engagement members provided in a first arrangement for receiving a plurality of cable-end connectors. The hub mounted connectors may be provided in a second arrangement by at least one stab plate. The first arrangement and the second arrangement are complementary such that on displacement by the at least one actuation mechanism, for example by displacement of the stab plate(s), each engagement member is aligned with a hub mounted cable connector. For example, the location of and spacings between the engagement members in the first arrangement substantially matches the location of and spacings between the hub mounted cable connectors in the second arrangement.

The engagement members may for example be provided as circular arrangements or rectilinear arrangements.

The arrangement of the engagement members and/or the hub mounted cable connectors may have a degree of rotational symmetry. This arrangement allows the hub to be mounted onto the base in more than one position.

Each engagement member may comprise a base portion for locating in use adjacent a bed of a river or sea; a locating feature located at or adjacent a first end of the engagement member; and at least one attachment feature located at or adjacent a second opposed end of the engagement member. A first locating feature may be located at or adjacent the first end of the engagement member. A second locating feature may be located between the first and second ends of the engagement member.

The base may further comprise at least one alignment feature for alignment with at least one alignment feature of the hub. The stab plate(s) may further comprise at least one alignment feature for alignment of the stab plate(s) relative to the engagement member(s) of the base. The alignment feature(s) may be any combination of suitable features, such as for example protrusions, openings, recesses, or combinations thereof. The alignment feature(s) may for example be centrally located.

The engagement members may be located on the base in any suitable arrangement. For example, the engagement members may extend in a circular arrangement around a centrally located alignment feature(s) of the base. The hub mounted cable connectors may extend in a circular arrangement around a centrally located alignment feature(s) of the hub.

In a further embodiment, the at least one engagement members of the base and/or the cable-end connectors are located outboard of the vertical projection of the hub.

The base may further comprise a transformer if the export cable mounted connector(s) and/or the export cable connector are drymate connectors.

The cable-end connector(s) may be mounted within at least one cable head system. In an embodiment, the cable-end connector is mounted within a separate cable head system. A plurality of cable-end connectors may be mounted within a single cable head system. The system may comprise a single cable comprising multiple cable-end connectors or cable head systems. For example, the different cores of a cable may be split out to separate cable-end connectors or to separate cable-end connectors within a single cable head system. For example, separate phases, communications, auxiliary power, control etc may be split out to separate cable-end connectors within a single cable head system.

More particularly, the cable-end connector(s) and/or engagement member(s) and/or cable head system are located outboard of the clamp.

The or each cable-end connector(s) within a cable head system may comprise individual local float and/or compliance relative to the cable head system.

A plurality of cable-end connectors mounted within a cable head system may comprise collective float and/or compliance relative to the cable head system.

The cable head system may be sealed from water ingress. Alternatively, the cable head system may provide a plurality of fill and drain openings to allow flooding of the cable head system. The cable head system may comprise a frame in which the cable-end connector(s) is mounted.

The cable head system may comprise at least one appurtenance for aiding lifting/lowering; alignment; capture of the cable head system; and/or laying away of the corresponding cable. The cable-end connector(s) further comprises local float and/or compliance relative to the cable head system.

The at least one engagement member of the base and the cable-end connectors or cable head systems comprising the cable-end connectors, comprise engagement features to releasably engage each other. The engagement member(s) comprises at least one engagement feature for releasable engagement with the cable connector(s). The engagement features may be any suitable combination of engagement features to provide releasable engagement between the engagement member(s) and the cable-end connector or cable head system comprising the cable-end connector.

The cable-end connector(s) may be mounted within a cable head system on one or more cable connector mountings. The cable connector mounting(s) may be located within one or more recesses provided by the cable head system in order to protect against any accidental damage to the mounting from external factors.

The cable head system(s) may provide at least one first locating feature, such as for example a ridge, recess or contoured surface. The engagement member(s) of the base may also provide at least one first locating feature shaped and dimensioned to receive the first locating feature(s) of the cable head system. For example, the engagement member(s) of the base may provide at least one ridge, recess or contoured surface for receiving and/or engaging the at least one first locating feature of the cable head system. The engagement member(s) may comprise a plurality of support arms arranged to provide, for example, a recess shaped and dimensioned for receiving and/or engaging the at least one first locating feature of the cable head system(s). The first locating feature(s) of the cable head system(s) and the engagement member(s) of the base are arranged to provide for gross positioning of the cable head system(s) with respect to the respective engagement member(s).

The cable head system(s) may provide at least one second locating feature, such as for example a recess or a projection. The engagement member(s) of the base may also provide at least one second locating feature shaped and dimensioned to receive and/or engage the at least one second locating feature of the cable head system(s). For example, the engagement member(s) of the base may provide at least one projection or recess for receiving and/or engaging the at least one second locating feature(s) of the cable head system(s). The second locating feature(s) of the cable head system(s) and the engagement member(s) of the base are arranged to provide for accurate positioning of the cable head system with respect to the engagement member(s) of the base. The second locating feature(s) may for example be an inwardly tapering recess. The recess may taper inwardly along the length of the recess from the opening provided by a surface of the engagement member or cable head system. The second locating feature of the engagement member(s) provides a fixed point for reacting loads during cable installation.

The first and/or second locating feature(s) may be provided in any suitable location on the cable head system and/or the engagement member(s) of the base. The engagement member(s) comprises a base portion for locating adjacent the bed of the river or sea. The cable head system comprises a first surface arranged in use to be located adjacent the base portion of the engagement member(s). The first surface of the cable head system provides the first and/or second locating feature(s).

The cable head system may comprise a first surface arranged in use to be located adjacent the base portion of the engagement member(s) of the base and a second opposed surface. The second locating feature(s) may be a recess extending from the first surface of the cable head system in a direction extending towards the second opposed surface of the cable head system. The recess may taper inwardly along the length of the recess from the opening provided at the first end of the recess at the first surface of the cable head system towards the second opposed end of the recess. The cross-sectional dimensions, for example the diameter, of the first end of the recess(es) may be greater than the cross-sectional dimensions, for example the diameter, of the second opposed end of the recess(es). The tapered recess(es) may be provided so as to enable more accurate positioning of the cable head system relative to the hub.

The first and/or second locating features may be provided in any suitable location on the first surface of the cable head system. The first and/or second locating features may for example be located in a central location or may be off-set from the centre of the first surface of the cable head system.

The hub further comprises a dryspace for housing equipment associated with the connection of multiple turbines to a common export connection.

The system may comprise at least one hub and a base. In an embodiment, the at least one hub is orientatable with respect to the base during deployment of the at least one hub. For example, the system may further comprise at least one drive system for orientating the at least one hub with respect to the base. The drive system(s) may be any suitable drive system, such as for example mechanical or hydrodynamic. The at least one hub may be passively orientated with respect to the base, for example by being orientated during lowering/pulldown of the at least one hub towards and/or onto the base.

In one embodiment, the system comprises a plurality of hubs. Each hub comprises a separate stabbing mechanism arranged for engagement with one of the cable-end connectors located within the engagement member(s) of the base. More particularly, each hub is arranged to engage a separate cable-end connector.

The actuation mechanism may comprise at least one flexible cable extending from the hub. The flexible cable(s) may be arranged to extend between the stab plate(s) and the hub. The flexible cable(s) may be arranged so as to be displaceable so as to displace with the stab plate(s) comprising the hub mounted cable connector(s). The stab plate(s) comprising the hub mounted connector(s) is provided at a first end of the flexible cable. The flexible cable(s) comprises a connector located at one or more of the end arranged to engage the hub; the end arranged to engage the cable-end connector or cable head system. The flexible cable(s) comprises a connector located at both the end arranged to engage the hub and the end arranged to engage the cable-end connector or cable head system. The end of the cable arranged to engage the hub further comprises at least one penetrator or any other suitable connector to allow the external circuits to be brought into the dryspace of the hub. An example of a suitable connector(s) is a suitably designed bulkhead drymate connector. The end of the flexible cable arranged to engage the cable-end connector further comprises a wetmate connector. The flexible cable may comprise any combination of suitable connectors. For example, the connectors may be one or more of drymate connectors, wetmate connectors or combinations thereof.

The at least one actuation mechanism may be moveable between an engaged position providing engagement between at least one cable-end connector located within the engagement member(s) and at least one hub-mounted cable connector of the stab plate(s), and a disengaged position in which at least one cable-end connector located within the engagement member(s) is disengaged from the at least one hub-mounted cable connector of the stab plate(s). The at least one actuation mechanism may be arranged to align the hub-mounted connector(s) of the stab plate(s) with the corresponding cable-end connector(s) prior to linear/axial stabbing. The at least one actuation mechanism comprises an alignment mechanism for aligning the stab plate(s) relative to the cable-end connector(s). The alignment mechanism may be arranged to align the stab plate(s) relative to the cable-end connector(s) by rotational movement relative to the hub. In the engaged position, the stab plate(s) may be located outboard of the vertical projection of the hub. In the disengaged position, the stab plate(s) are more particularly located inboard of the vertical projection of the hub. The actuation mechanism(s) retracts inboard when the cable connectors are disconnected. The actuation mechanism(s) may be located inboard of the vertical projection of the hub so that the corresponding cable-end connector or corresponding cable head system comprising a cable-end connector located within the corresponding engagement member can be lifted vertically from above when being removed/replaced. As a result, this operation does not require the hub to be removed in order to remove a cable-end connector.

In an embodiment, the actuation mechanism comprises at least one stabbing mechanism to provide a connection between at least one hub-mounted connector and at least one corresponding cable-end mounted connector associated with each turbine spur. For example, the hub comprises a plurality of separate stabbing mechanisms, in which each stabbing mechanism is arranged to provide a hub-mounted cable connector for engagement with a cable-end connector of each turbine spur.

The actuation mechanism(s), for example the stabbing mechanism(s), may comprise local float and/or compliance in its mounting to the hub. The hub mounted cable connector(s) may further comprise local float and/or compliance relative to the actuation mechanism(s), for example the stabbing mechanism(s). The hub mounted cable connector(s) may comprise local float and/or compliance relative to the stab plate(s). The plurality of hub mounted connectors may comprise collective float and/or compliance relative to the stab plate(s).

The actuation mechanism(s) may further provide at least one first functional cap for engaging at least one cable-end connector. In the disengaged position, the actuation mechanism (s) may be arranged to engage at least one first functional cap with the at least one cable-end connector. The actuation mechanism(s) may further provide at least one second functional cap for engaging the corresponding at least one hub-mounted cable connector. In the disengaged position, the actuation mechanism(s) may be arranged to engage at least one second functional cap with the at least one hub-mounted cable connector. In an embodiment, each actuation mechanism is able to engage and disengage caps with a cable-end connector and/or a hub-mounted connector in each pair of corresponding connectors provided by the base and hub. The functional caps are blind connectors comprising all the seals and functions of a connector. The functional caps, when engaged to the at least one cable-end connector or the at least one hub-mounted connector, prevent the connector(s) from being exposed to the seawater. The second functional cap, when engaged with the hub-mounted connector(s) also enables the hub end of the corresponding spur to be energised at full working voltage. As a result, a separate isolator for the spur is not required to be present within the hub. The hub and the remaining healthy turbines can therefore be operated while the damaged cable is taken away and replaced. The hub only needs to be switched "off" while the connectors are disconnected and the caps engaged to the corresponding connectors. The hub can then be operated again. As a result, the down time of the hub is significantly reduced compared to conventional systems.

In the engaged position, the actuation mechanism(s) may be arranged to store the at least one first and/or second functional caps. In the engaged position, the at least one first and/or second functional caps are disengaged from the respective cable-end and/or hub-mounted connectors.

The first and second functional caps comprise engagement features for mutual engagement such that when the actuation mechanism(s) is in the engaged position the first functional cap engages the second functional cap. Engagement of the first and second functional caps ensures that the caps are protected from external factors while not in use.

The cable head system may also comprise at least one recess for storing at least one first and/or second mating caps.

The actuation mechanism may comprise a stabbing mechanism comprising a stabbing assembly and at least one actuator. The actuator(s) may comprise at least one swing arm rotationally attached to the cable connector system. The at least one swing arm may be arranged to move the stabbing mechanism between a withdrawn position in which it is substantially misaligned with the cable-end connector(s) or with the cable head system(s) and an aligned position in which the stabbing mechanism is substantially aligned with the cable-end connector(s) or with the cable head system (s). In the aligned position the cable-end connector(s) or cable head system(s) are aligned so as to be mated with the hub-mounted connectors by a stabbing motion. In the aligned position, the stabbing assembly may overlie the cable-end connector(s) or cable head system(s) and the swing arm may be arranged such that in the withdrawn position the stabbing assembly does not overlie the cable-end connector(s) or cable head system(s) (and is, for example, clear of the vertical projection of the cable-end connector(s) or cable head system (s)). The swing arm may move the stabbing assembly about an arc between the withdrawn and the aligned positions. In the aligned position the swing arm may extend at an angle, substantially perpendicular, to the cable-end connector(s) or the cable head system(s).

According to a further aspect, the present invention comprises a stabbing system comprising a stabbing assembly and at least one actuator, wherein the at least one actuator is arranged to displace the stabbing assembly between a withdrawn position and an aligned position in which the stabbing assembly is generally aligned with a cable-end connector(s) or cable head system(s), and wherein the stabbing assembly is arranged to provide relative linear movement of a stab plate(s) relative to the assembly. The stabbing assembly may for example be arranged to provide vertical movement of a stab plate(s). The at least one actuator may be arranged to rotate the stabbing assembly between the withdrawn position and the aligned position. At least one swing arm may be provided for the rotational movement. The rotational movement may be arranged such that in the withdrawn position the stabbing assembly does not overlay the cable-end connector(s) and/or cable head system(s) in which the cable-end connector is provided. The relative linear movement of the stab plate(s) may be arranged to make/break the connection formed between the cable-end connector(s) and the hub-mounted connector(s) when the stabbing assembly is in the aligned position. The stabbing assembly may be arranged to be moveable through or into an intermediate position between the withdrawn and aligned position. The intermediate position may be such that the stab plate(s) is lowered relative to the cable head system(s). Prior to reaching the aligned position, the swing arm is moveable such that the stab plate(s) is lowered relative to the cable head system. In the intermediate position at least a portion of the stabbing assembly may be arranged to engage the cable head system. In the intermediate position, the stab plate(s) may be arranged to engage a first cap located on the cable-end connector.

The stabbing assembly may be actuated by a first hydraulic actuator. The swing arm may be actuated by a second hydraulic actuator.

The swing arm may extend from a first end proximal to the stabbing assembly to a second end distal from the stabbing assembly. The swing arm may be pivotally mounted proximal to the second end. The swing arm may be pivotally attached to a frame which is associated with hub. A hydraulic ram may be provided proximal to the second end for actuation of the swing arm.

At least one stab plate may be moveable relative to the swing arm and/or frame, for example in a linear motion. The movement actuated by the at least one stab plate may be arranged to make/break the connection between the connectors, such as for example an electrical or fibre optic connection, and the movement actuated by the swing arm may be arranged to bring the stab assembly in/out of alignment with the cable-end connector or cable head system. The stab plate assembly may comprise a hydraulic actuator.

The stabbing assembly may include a stabbing frame, for example an articulated stabbing frame, for alignment with the cable head system when the swing arm is in the aligned position. In an embodiment, the stab plate(s) is carried by the stabbing frame. The stabbing frame may be provided proximal to the first end of the swing arm. The stabbing frame is arranged to align and take a reference position relative to the surface or side portion of the cable head system providing the recess. The articulated stabbing frame engages the cable head system so as to enable the stabbing frame to pivot relative to the cable head system in order to achieve correct alignment of the stabbing frame with respect to the surface or side portion of the cable head system providing the recess.

The stab plate may be moveably attached to the articulated stabbing frame by a hydraulic mechanism. The stabbing system comprises at least one hydraulic ram located between the stab plate and the articulated frame.

The stabbing system further comprises at least one guide mechanism arranged to guide the movement of the stab plate(s) relative to the cable-end connector(s) or cable head system(s). The connector(s) or the cable head system(s) may for example provide at least one attachment feature for engaging the at least one guide mechanism of the stabbing system in order to guide the movement of the stab plate(s) relative to the cable-end connector(s) or cable head system(s). The guide mechanism may for example comprise one or more projections. The cable head system may comprise one or more stop feature arranged to engage the guide mechanism(s) of the stabbing system. The stop feature(s) may comprise one or more slots arranged to limit the extent of the movement of the stab plate(s) relative to the cable-end connector(s) or cable head system(s). In the intermediate position, the stab plate(s) may be lowered relative to the cable head system such that one or more guide mechanism, for example projections, are received within the stop feature(s) of a corresponding cable head.

The hub(s) may comprise at least one flexible cable extending from the hub(s). The at least one flexible cable may be connected at a first end to the hub(s) by at least one penetrator or any other suitable connector to allow the external circuits to be brought into the dryspace of the hub. An example of a suitable connector(s) is a suitably designed bulkhead drymate connector. The second end of the at least one flexible cable(s), for example the 'free' end, may comprise at least one hub mounted connector. The at least one hub mounted connector may be a wetmate connector. The at least one hub mounted connector may comprise at least one attachment feature for engaging an ROV. During deployment of the hub(s), the free end of the flexible cable comprising the hub mounted connector(s) is stowed in a suitable location such that an ROV can engage the attachment feature(s) of the hub mounted connector(s). The ROV may be operated to move the hub mounted connector(s) into engagement with the corresponding cable-end connector(s) or export cable mounted connector(s). The ROV may be operable to remove/replace and/or store the functional cap(s) which are engageable with the hub mounted connector(s) and/or the cable-end connector(s) and/or the export cable mounted connector(s).

The cable-end connector(s) may lowered into position by a deck mounted winch or deck crane. The cable-end connector(s) may be maneuvered into position relative to the base by a remotely operated vehicle (ROV), a winch and/or a crane. The cable connector(s), for example the cable head system, may therefore further comprise at least one appurtenance for aligning with and/or engaging an ROV and/or a deck mounted winch and/or deck crane. For example, the second surface or the second side portion of the cable head system may provide at least one appurtenance for aligning with and/or engaging an ROV and/or a deck mounted winch and/or deck crane. The at least one appurtenance provided by the cable connector(s) provides for releasable engagement with an ROV and/or deck mounted winch and/or deck crane. For example, the cable connector(s), for example the cable head system, comprises a flange for mounting at least one appurtenance for aligning with and/or engaging an ROV and/or a deck mounted winch and/or deck crane. The appurtenance (s) may be any suitable feature, such as for example a projection, opening or recess. The ROV, deck mounted winch and/or deck crane may be released from the cable head system when the head has been approximately aligned with the corresponding engagement member. Release of the ROV, winch and/or crane may therefore enable the cable head system to be dropped or lowered into engagement with the corresponding engagement member. The cable connector(s) and/or cable head system(s) may be lowered vertically from above using a deck mounted winch and/or deck crane. Optionally, a ROV may be used to observe and to disconnect the connector(s) and/or cable head system(s) from the winch and/or crane. An ROV may however be used to steer the connector(s) and/or cable head system (s) to the desired location.

DETAILED DESCRIPTION

Figure 1:
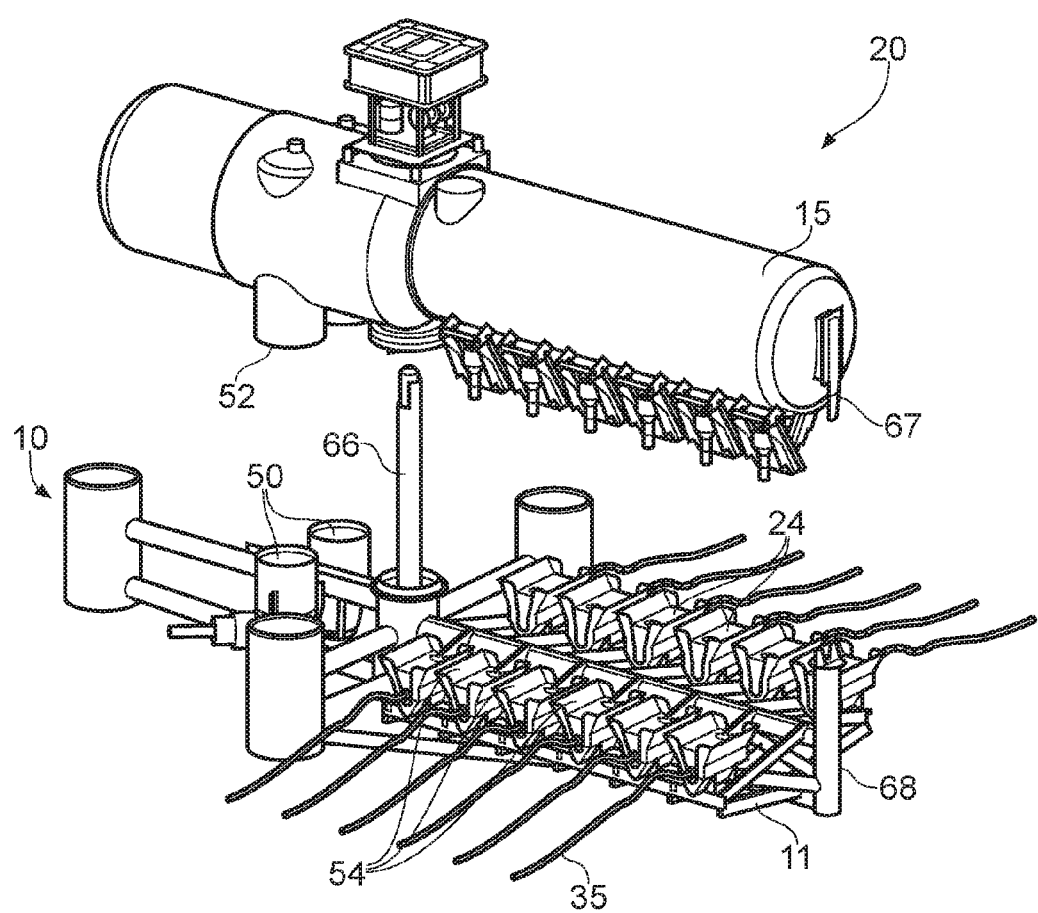
FIG. 1 is a perspective view of the subsea cable engagement system of the present invention in which the hub is disconnected from the base.
Figure 2:
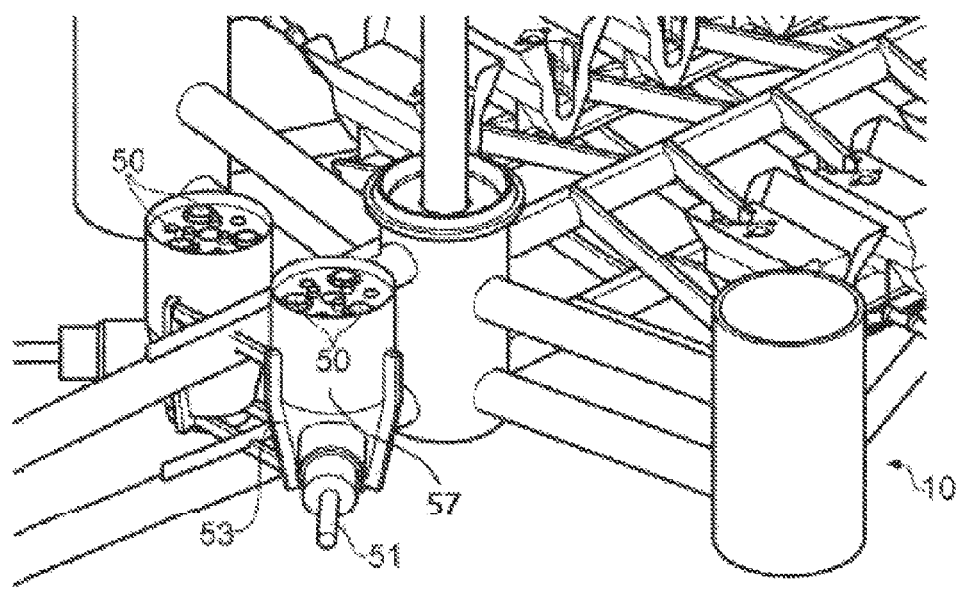
FIG. 2 is a perspective view of an export cable head system according to one embodiment of the present invention in which the hub is disconnected from the base.
Figure 3:
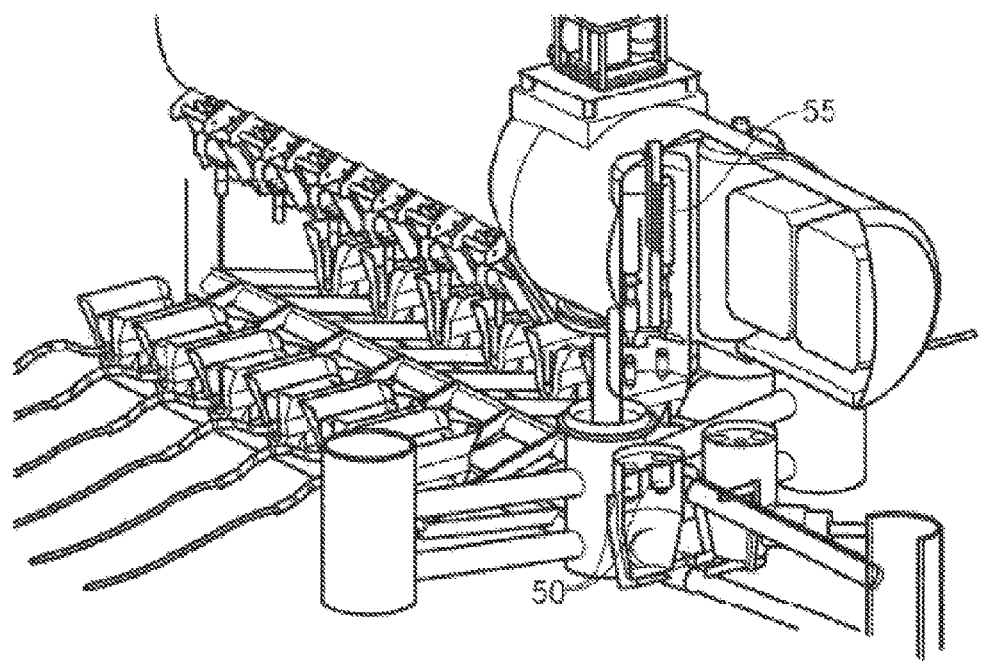
FIG. 3 is a cross-sectional view of the export cable head system of FIG. 2.

With reference to FIGS. 1 to 8, the subsea cable engagement system 20 for connecting at least one cable-end connector in communication with a power generation unit, such as for example a turbine, to a hub-mounted cable connector.

The system 20 comprises a base 10 providing a plurality of export cable mounted connectors 50 in communication with export cable 51. The export cable mounted connectors 50 are located within export cable head systems 57. The export cable head systems 57 are received within export engagement members 53. The system 20 further comprises a hub 15 providing a plurality of export cable connectors 52. The export cable connectors 52 and the export cable mounted connectors 50 are wetmate connectors. The hub 15 further comprise an export actuation mechanism 55 to displace the export cable connector 52 of the hub 15 and the export cable mounted connector 50 in a direction towards and/or away from each other. The export actuation mechanism is arranged to provide vertical displacement of the export cable connectors 52 of the hub 15 towards and/or away from the export cable mounted connector 50.

The export cable connectors 52 are provided in a first spaced apart arrangement and the export cable mounted connectors 50 are provided in a second spaced apart arrangement. The first and second arrangements are complementary such that on displacement of the export cable connectors 52 by the export actuation mechanism 55 the export cable mounted connectors 50 mate with the export cable connectors 52.

Figure 4:
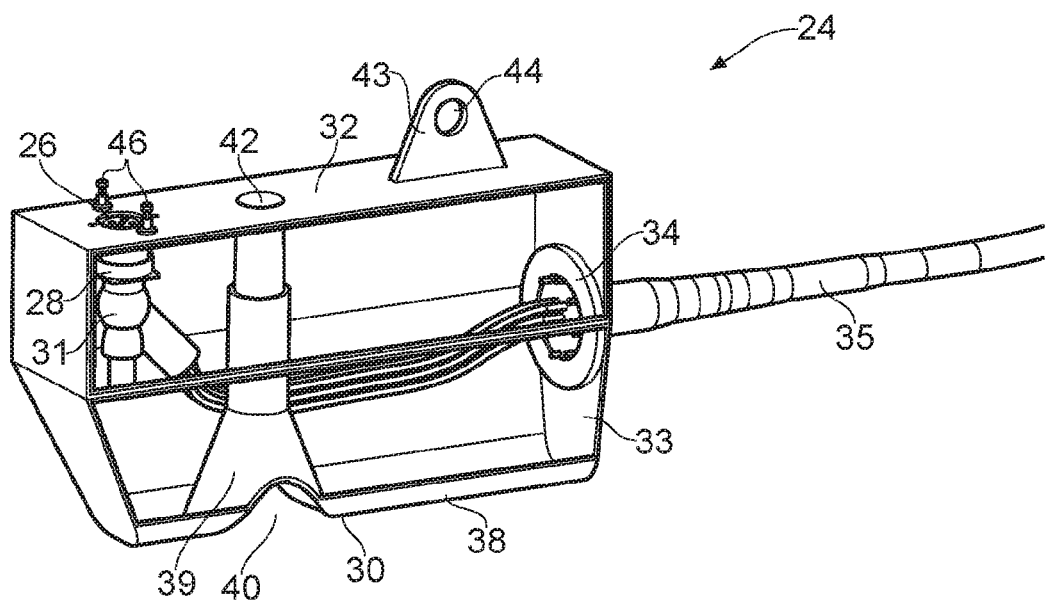
FIG. 4 is a perspective view of a cable head system according to a further embodiment of the present invention.
Figure 5:
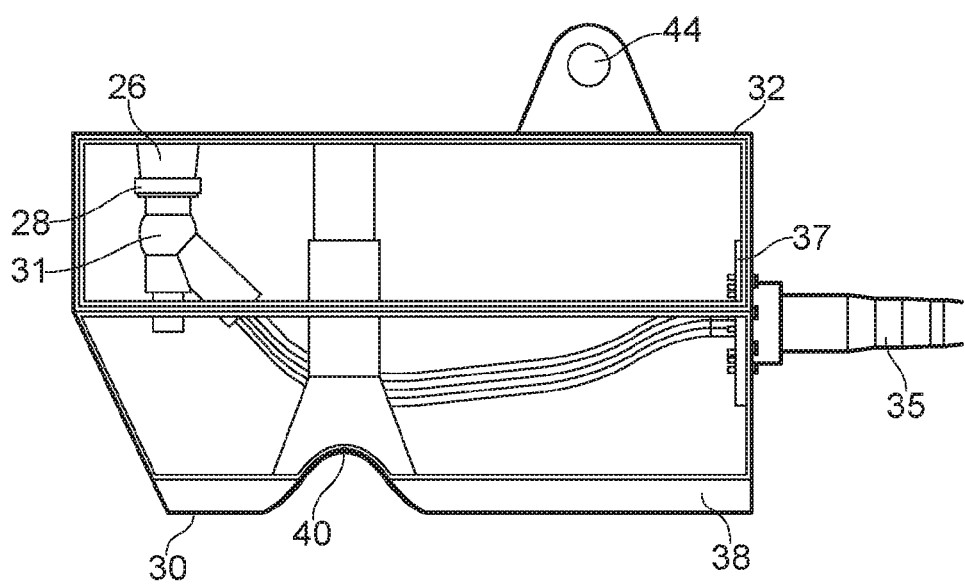
FIG. 5 is perspective a view of a cable head system providing for horizontal mounting of the cable according to a further embodiment of the present invention.

The system 20 comprises a plurality of cable head systems 24. The cable head systems 24 are arranged in a rectilinear arrangement comprising two rows of cable head systems 24. Each cable head system 24 has a first surface 30 and a second opposed surface 32. As shown in FIGS. 4 and 5, the second surface 32 provides a recess 26. The recess 26 is substantially circular in shape. A cable connector mounting 28 is located within the recess 26 in order to protect against any accidental damage to the mounting 28. The connector mounting 28 comprises a flange located within the recess 26 for mounting the cable-end connector 31. The cable-end connector(s) is located within the cable head system 24 spaced apart from the second surface 32 of the cable head system 24. The cable-end connector 31 may comprise one or more of an electrical connector, a fibre optic connector, a hydraulic connector, or any hybrid combination thereof. This arrangement enables the stab plate to be operated in a vertical stabbing action.

The cable head system 24 further comprises a first side portion 33 extending between the first 30 and second 32 surfaces. The first side portion 33 provides an aperture 34 arranged to receive a portion of cable 35. The aperture 34 may also allow for mechanical termination of the cable armouring. The first side portion 33 further comprises a substantially annular flange 37 adjacent the aperture 34.

Although it is shown in FIGS. 4 and 5 that the recess 26 is provided in the second surface 32 it is to be understood that the recess 26 may be provided in any suitable surface of the cable head system 24 depending on where the connector mounting 28 is to be located.

Figure 7:
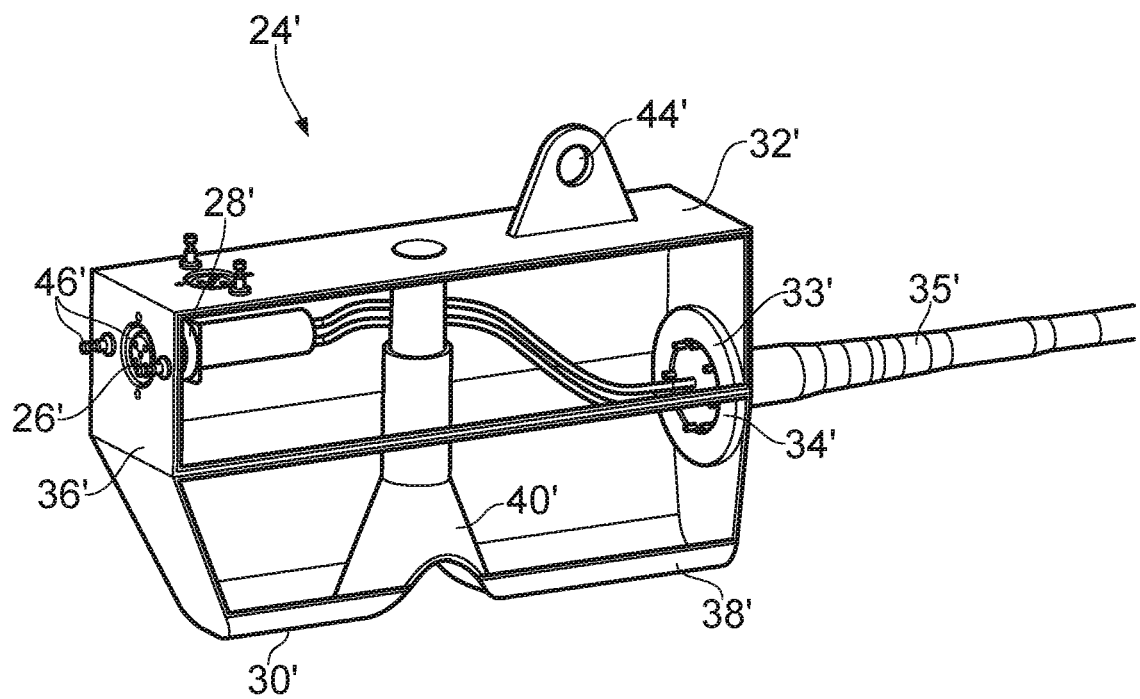
FIG. 7 is cross-sectional perspective view of a cable head system.

Another embodiment is shown in FIG. 7, in which the cable head system 24' has a first surface 30' and a second opposed surface 32'. A first side portion 33' extends between the first and second surfaces 30' and 32' and provides an aperture 34' arranged to receive a portion of cable 35'. The cable head system 24' comprises a second opposed side portion 36' providing recess 26'. A cable connector mounting 28' is located within the recess 26'. This arrangement of the cable head system enables the stab plate to be operated in a horizontal stabbing action. All of the other features of this cable head system 24' are the same as the embodiment shown in FIGS. 4 and 5. The description of these other features as described in relation to FIGS. 4 and 5 is equally applicable to this embodiment.

The cable head system 24 further provides a first locating feature in the form of a contoured surface 38 provided by the first surface 30. The cable head system 24 further provides a second locating feature in the form of a recess 39. The recess 39 is provided by the first surface 30 of the cable head system 24. The recess 39 extends from the first surface 30 towards the second surface 32 of the cable head system 24. The recess 39 tapers inwardly along its length from the first end 40 of the recess 39 provided at the first surface 30 towards its second end 42.

An appurtenance 43 extends from the second surface 32 of the cable head system 24. The appurtenance 43 provides an opening 44.

The second surface 32 of the cable head system 24 further provides two spaced apart projections 46 arranged to engage reciprocal engagement features, such as for example recesses, on a remotely operated vehicle (ROV). The ROV may use a manipulator to stab in a connector.

Figure 6:
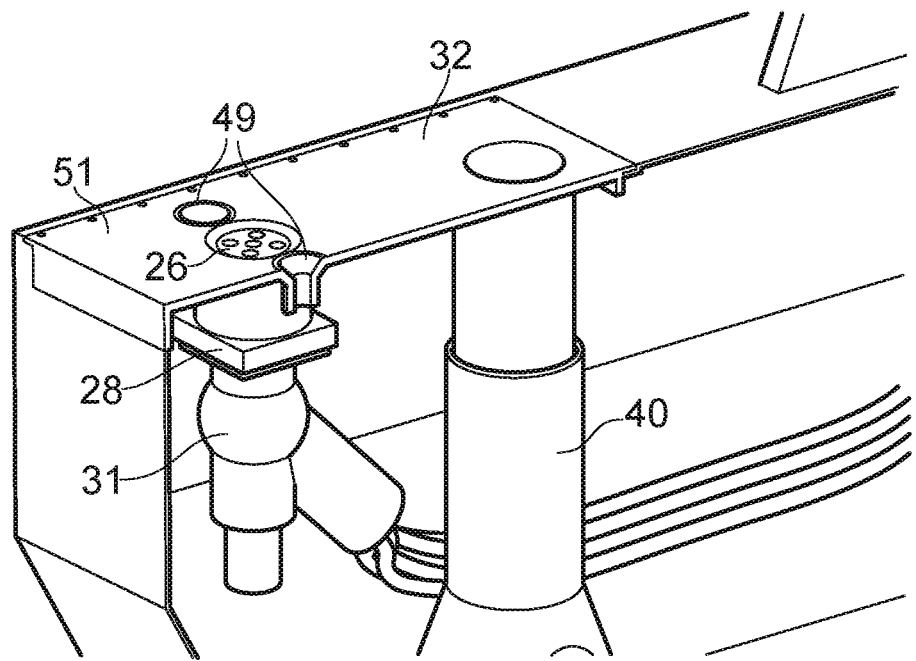
FIG. 6 is a cut-away perspective view of a cable head system.
Figure 8:
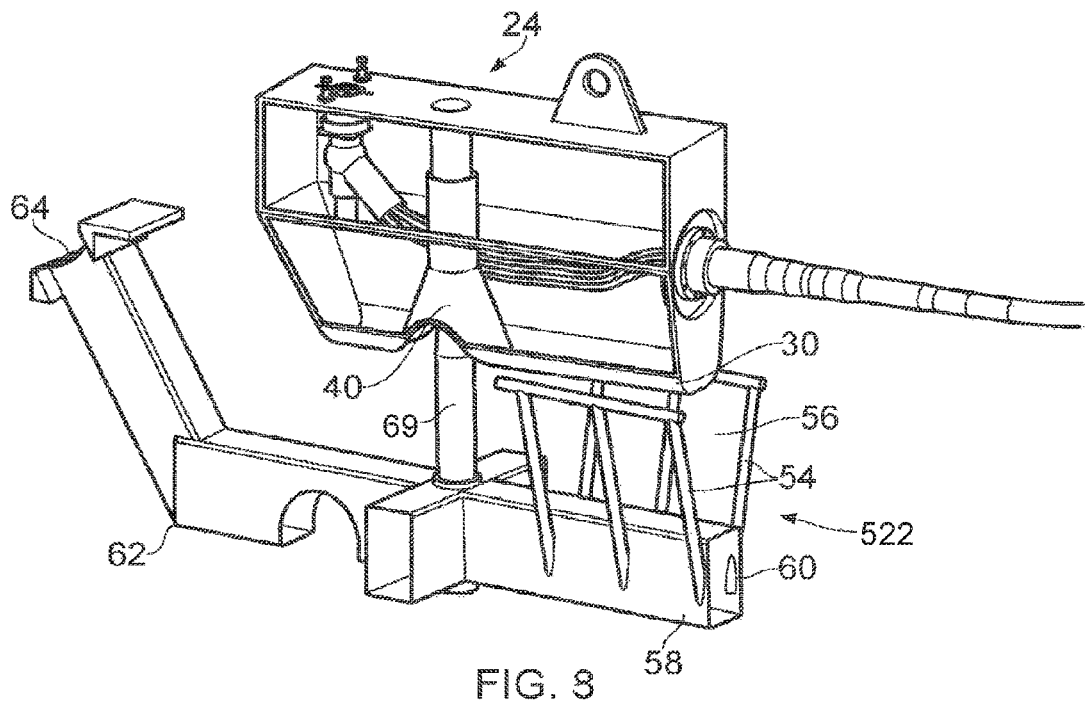
FIG. 8 is an illustration of the deployment of a cable head system of the cable connector system onto a mounting frame of the hub according to one embodiment of the present invention.
Figure 9:
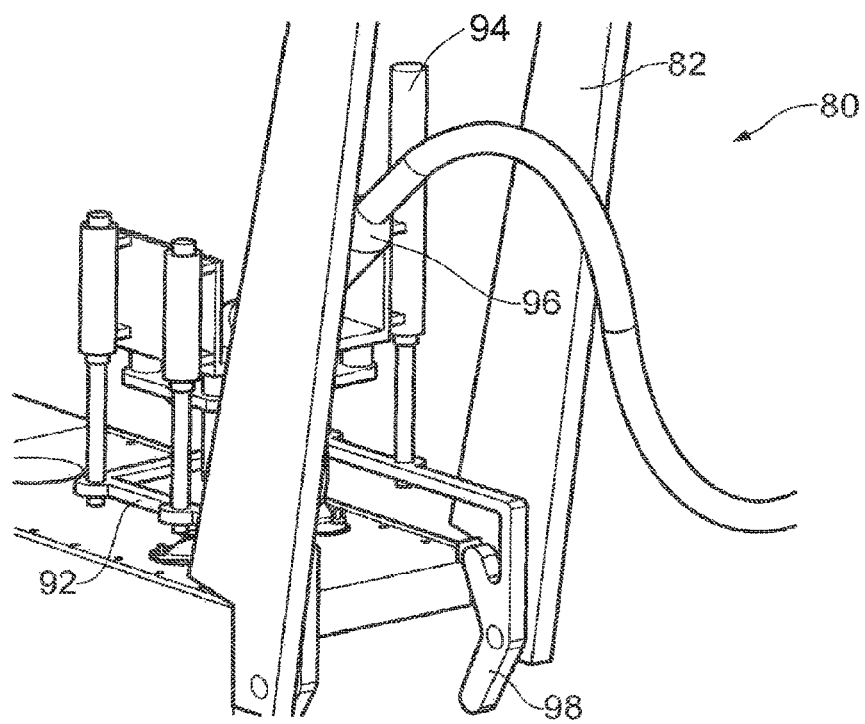
FIGS. 9 and 10 are illustrations of the stabbing mechanism according to one embodiment of the present invention.
Figure 10:
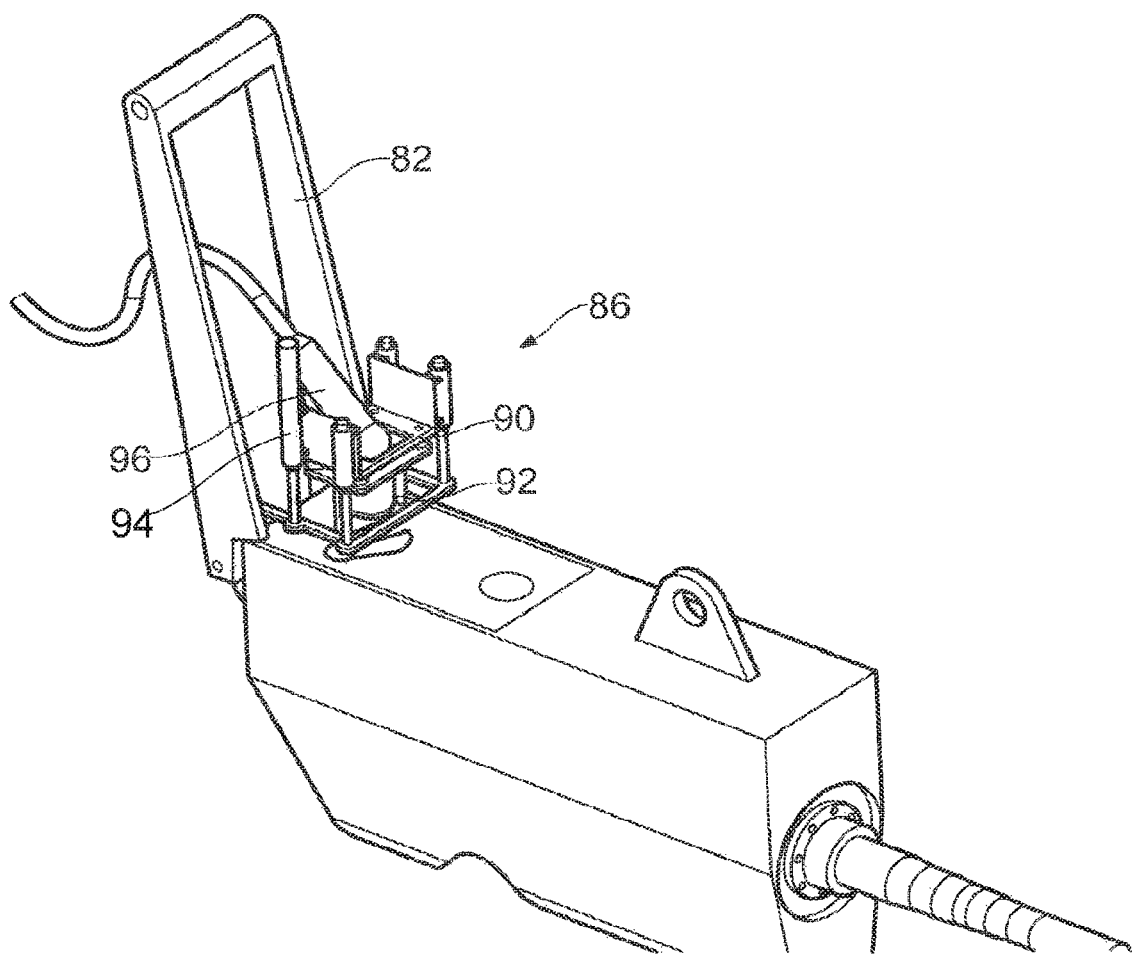
Figure 11:
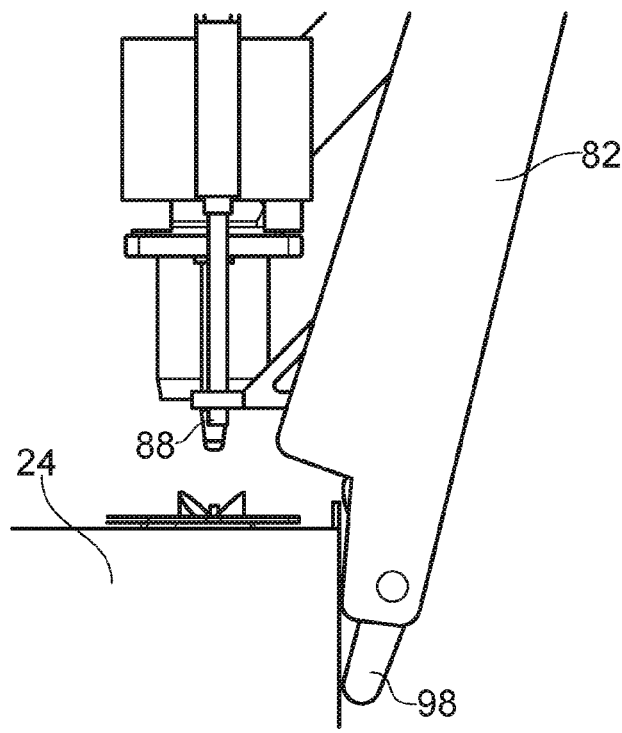
FIG. 11 is a side view of the stabbing mechanism of FIG. 9.

The system further comprises a stab plate and an actuation mechanism (FIGS. 9 and 10). As shown in FIG. 6, the second surface 32 of the cable head system 24 provides spaced apart alignment apertures 49 to align the stab plate relative to the cable mounting 28 within the recess 26. The stab plate comprises spaced apart projections shaped and dimensioned to be received within the apertures 49 of the cable head system 24. It is to be understood that the cable head system 24 may provide any suitable alignment features in order to align the stab plate relative to the cable mounting 28 within the recess 26. FIG. 6 shows the cable head system 24 providing alignment apertures 49 for engaging spaced apart projections provided by the stab plate. FIGS. 4 and 8 show the cable head system 24 providing alignment projections 46 for engaging spaced apart apertures provided by a stab plate. The alignment projections 46 may also be used by an ROV for use with a non-stabplate mechanism.

The actuation mechanism (FIG. 10) is arranged to provide relative movement between the stab plate and the cable head system 24. The actuation mechanism 80 is arranged to displace the stab plate 92 in a direction extending between the first and second surfaces 30 and 32 of the cable head system 24. The actuation mechanism 80 is also arranged to provide rotational movement between the stab plate 92 and the cable head system 24 in order to align the projections with the apertures 49 provided by the cable head system 24.

The system further comprises a base 10 providing a plurality of engagement members 522. Each engagement member 522 provides a plurality of spaced apart support arms or surfaces providing a recess 56 shaped and dimensioned to receive the first surface 30 of the cable head system 24. The support arms or surfaces are shaped and dimensioned to provide a recess which complements the contoured surface 38 of the cable head system 24.

The engagement member 522 comprises a base region 58 which is arranged in use to be located in a support structure 11. The support arms or surfaces 54 extend upwardly from the base region 58. In one embodiment, as shown in FIG. 8, the engagement member 522 comprises a plurality of support arms 54 located at or adjacent the first end 60 of the engagement member 522. The second opposed end 62 of the engagement member 522 comprises an attachment feature 64 for attaching the engagement member 522 to a support structure 11 of the base 10.

The engagement member 522 further comprises a projection extending upwardly from the base region 58. The projection is located between the support arms 54 and the second end 62 of the engagement member 522. The projection is shaped and dimensioned, and located, to be received within the recess 39 of the cable head system 24.

As shown in FIG. 6, the cable head system 24 can comprise a single section 51 which provides the recess 26 and the connector mounting 28 located within the recess 26. The single section 51 further provides apertures 49 to receive corresponding protrusions (not shown) on the stabplate 92. Alignment features 46 are arranged for engagement with an ROV. The alignment apertures 49 provided by the single section 51 are also arranged to enable alignment of the stab plate 92 relative to the cable head system 24. The single section 51 is arranged to be removably connected to the cable head system 24.

In use, the base 10 is placed at the desired location on the bed of the river, lake or sea. The base 10 comprises a central alignment feature in the form of projection 66 arranged to be received within an opening provided by the hub 15. The base 10 further comprises an alignment feature 68 located at a first end of the base 10 for engaging with an alignment feature 67 located at a first end of the hub 15. The engagement members 52 are located outboard of the vertical projection of the hub 15.

The ROV, or a deck winch or a deck crane deploys the cable and cable head system to be received within the engagement member(s) 522 of the system. An ROV may transport the cable head system 24 to the approximate location relative to the corresponding engagement member(s) 522. The positioning of the cable head system 24 may be observed with an observation ROV or without any ROV. The ROV, and any other connections (such as for example, winch connections), may then be decoupled from the cable head system 24 enabling the cable head system 24 to be dropped or lowered into engagement with the engagement member 522. The winch connection is released once the cable head system 24 is engaged with the engagement member 522. The contoured surface 38 provided by the first surface 30 of the cable head system 24 is lowered or dropped into the recess 56 provided by the support arms 54 of the engagement member 522. The shape of the contoured surface 38 and the shape of the recess 56 provide for gross alignment of the cable head system 24 relative to the engagement member 522. The projection 69 provided by the engagement member 522 is received within the recess 39 of the cable head system 24. The tapered recess 39 provides for accurate alignment of the cable head system 24 relative to the engagement member 522.

After decoupling, the ROV and/or winch/lifting equipment may then be connected to further cable head systems 24 in order to deploy a plurality of cable head systems 24 in total to be received within a plurality of engagement members in the desired array or formation. Each cable head system 24 may be deployed separately.

The stab plate 92 is aligned with the recess 26 provided by the second surface 32 of the cable head system 24. The actuation mechanism (FIGS. 9 and 10) may rotate the stab plate 92 about an axis extending perpendicular to the stab plate relative to the recess 26 of the cable head system 24 in order to align the spaced apart projections of the stab plate 92 with the alignment apertures 49 provided within the recess 26. The actuation mechanism then displaces the stab plate 92 in a direction from the second surface 32 towards the first surface 30 of the cable head system 24 to engage the hub-mounted cable connector(s) located on the stab plate 92 with the cable-end connector(s) 31 provided by the cable head system(s) 24.

Figure 12:
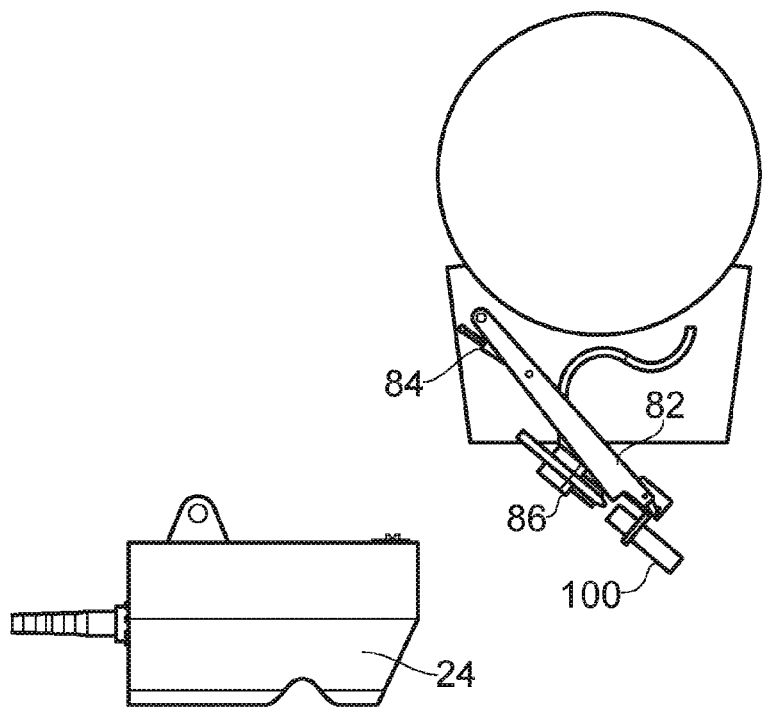
FIG. 12 is a side view of a stabbing mechanism according to one embodiment of the present invention.

In order to retrieve a cable, the actuation mechanism (FIGS. 9 and 10) displaces the stab plate 92 in a direction extending from the first surface 30 towards the second surface 32 of the cable head system 24. Displacement of the stab plate 92 disengages the hub mounted cable connector(s) of the stab plate 92 from the cable-end connector(s) 31 provided by the cable head system (s) 24. The stab plate 92 is stowed inboard of the vertical projection of the hub 15. Lifting mechanisms, such as for example a surface vessel winch or crane are attached to the lifting point 44 by for example an ROV. The cable head system(s) 24 are then lifted out by a surface vessel winch or crane. The cable head system(s) 24 is lifted off the projection 69 of the engagement member 522 in a substantially vertical direction. The ROV may be arranged to steer the cable head system(s) which is being lifted by the surface vessel winch or crane. Alternatively, the cable may be recovered by disengaging the stab plate 92 and stowing the stab plate inboard of the vertical projection of the hub 15. An ROV may then engage and move the cable head system(s) 24 to the surface. T As best seen in FIGS. 9 to 13, the actuation mechanism 80 comprises a stabbing mechanism comprising a swing arm 82. The swing arm 82 is actuated by a hydraulic ram 84 such that it may rotate relative to the cable head system 24 and carries a stab plate sub assembly 86. As shown in FIG. 12 the stab plate sub assembly 86 is located towards the middle of the swing arm. It is however to be understood that the stab plate sub assembly 86 may be located at any suitable location, such as for example at the free end of the swing arm. The stab plate sub assembly 86 includes linear guides 88, a carrier plate 90, the stab plate 92, a hydraulic ram 94 and the electrical connector 96. The swing arm 82 is arranged to be rotatable about an arc such that the stab plate assembly 86 may be moved between a first, alignment, position in which it is substantially aligned with the cable head system 24 (such that it is ready to make a connection) and a second, withdrawn, position in which the stab assembly 86 is fully withdrawn and is clear of the vertical projection of the cable head system 24. The swing arm 82 is arranged to move the stab plate 92 in a generally downward and outward arc relative to the cable head system(s) 24 when the stab plate 92 is moved towards the aligned position. The swing arm 82 is arranged to move the stab plate 92 in a generally upward and inward arc when moving towards the withdrawn position.

The swing arm 82 is connected to an articulated frame 98. The stab plate 92 is carried by the articulated frame 98. The articulated frame 98 is arranged to align with an opposing face (for example the front face) of the cable terminal head 24 and to provide a reference position for the frame such that it may align with the cable terminal head 24.

With the swing arm 82 in the aligned position the hydraulic ram 94 of the stab plate assembly 86 may move the stab plate 92 in a linear direction towards/away from the cable head system 24 such that an electrical connection, or any other suitable connection, between the hub mounted connector(s) of the stab plate 92 and the cable-end connector(s) 31 can be made or broken. Thus, the actuation mechanism has a primary rotational movement (via the swing arm hydraulic actuator) which enables the stab plate assembly 86 to be brought into and out of alignment with the cable head system 24 and a secondary linear movement (via the stab plate hydraulic ram) which allows the connection to be made/broken.

Figure 13:
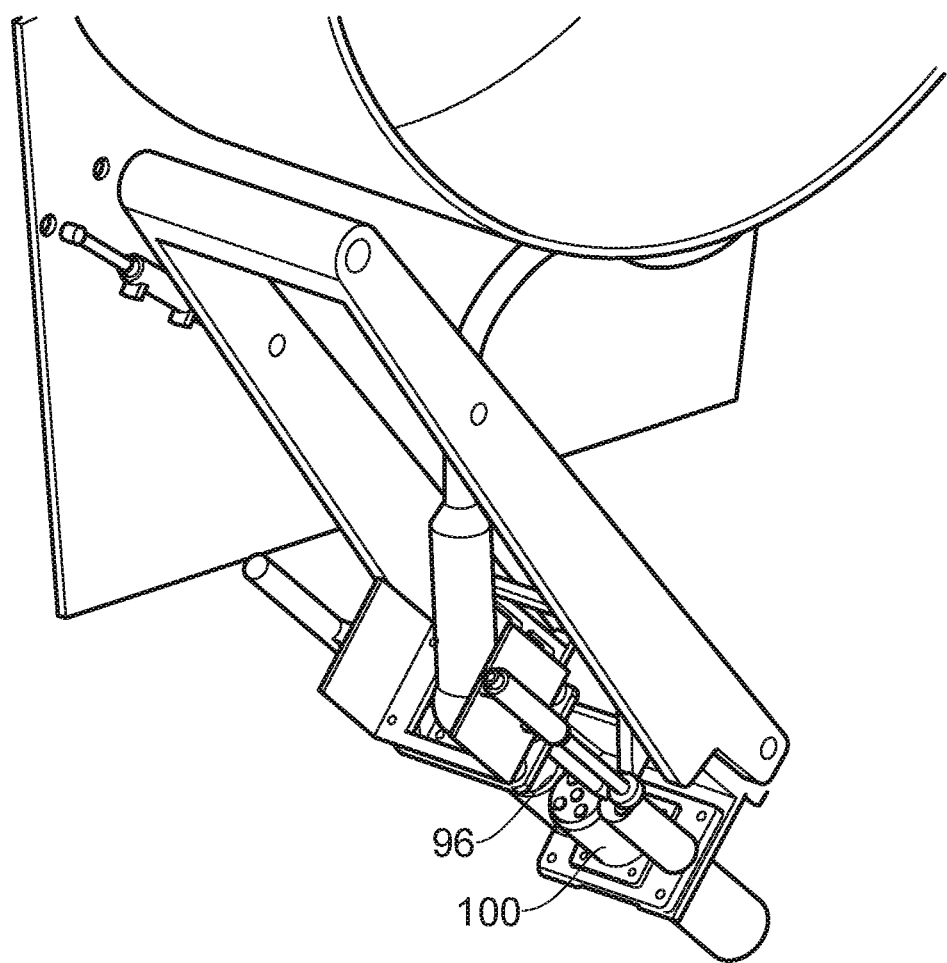
FIG. 13 is an illustration of a stabbing mechanism of FIG. 12.
Figure 14:
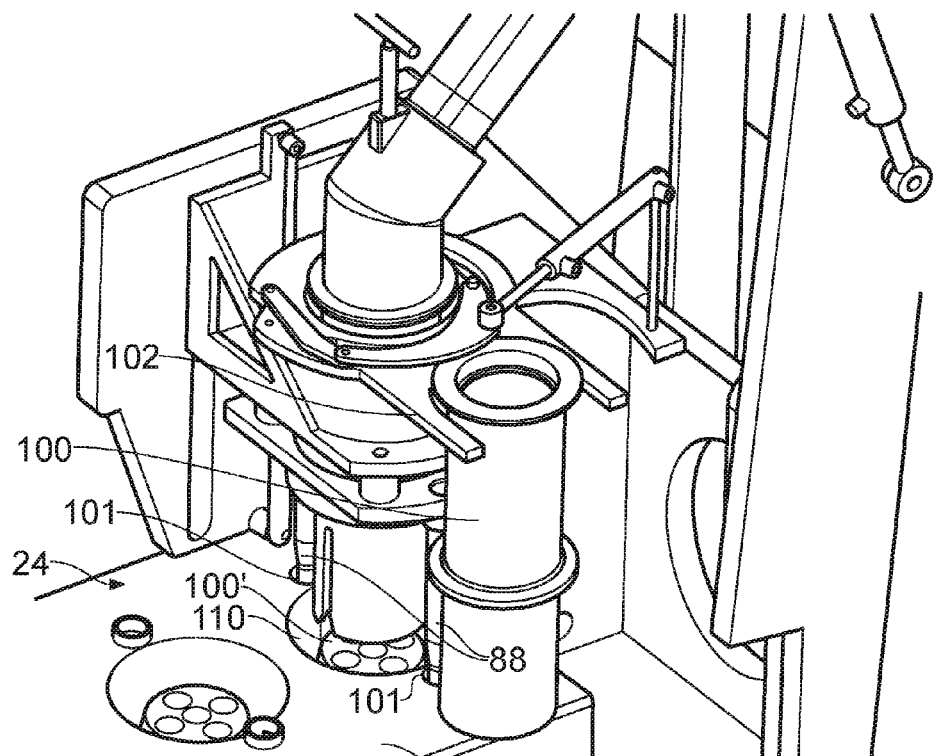
FIG. 14 is an illustration of a stabbing mechanism according to further embodiment of the present invention, in which the stabbing mechanism comprises functional caps.
Figure 15:
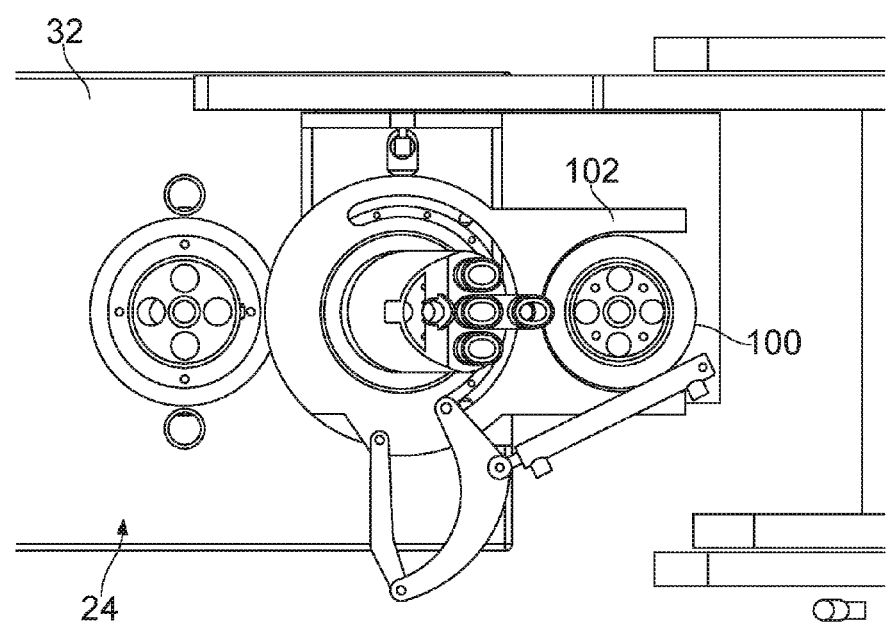
FIG. 15 is an illustration of a view from above of the stabbing mechanism of FIG. 14.
Figure 16A:
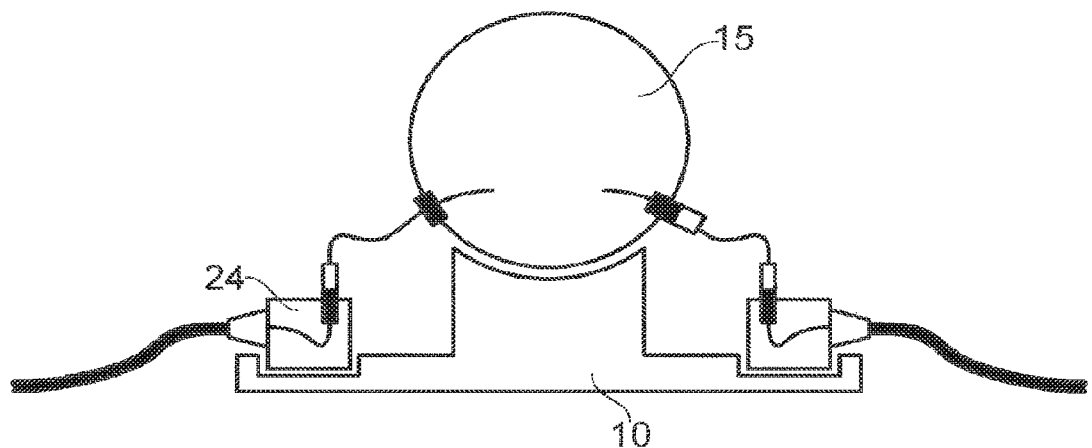
FIG. 16A and FIG. 16B are schematic views of flexible cables extending between the hub and cable head systems of the subsea cable engagement system according to one embodiment of the present invention
Figure 16B:
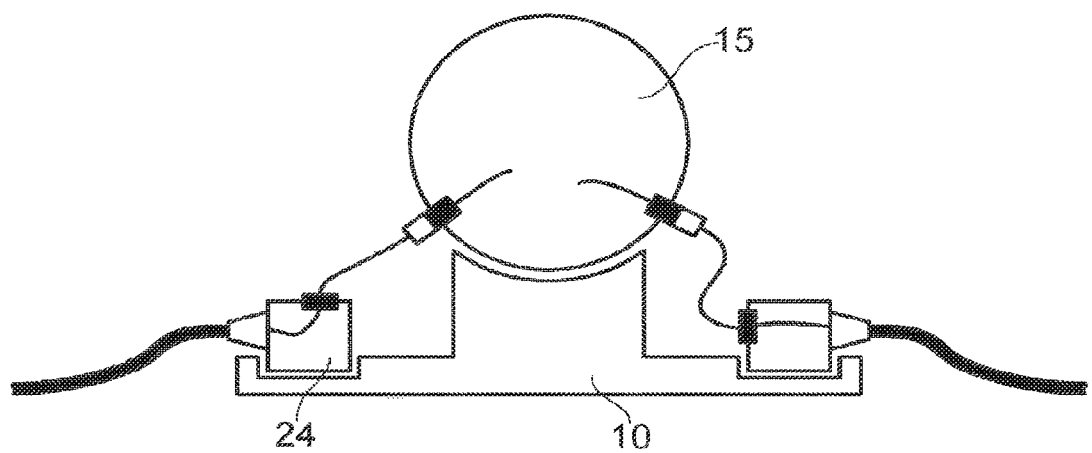
Figure 17:
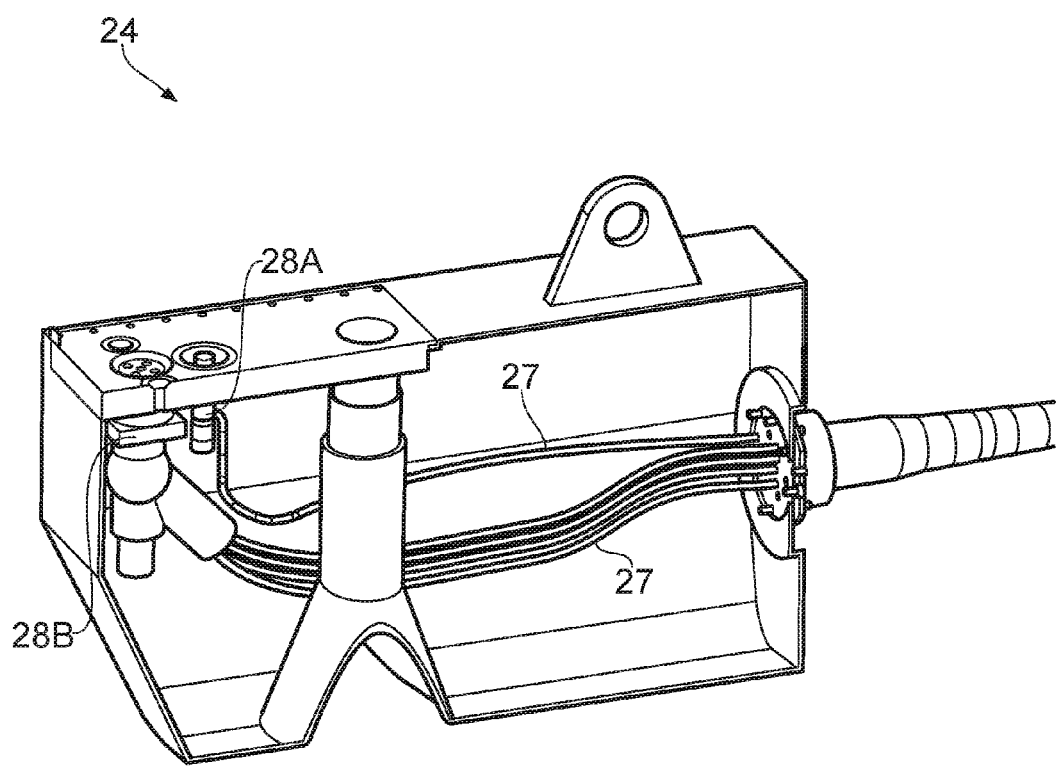
FIG. 17 is a cross-sectional perspective view of a cable head system showing a plurality of cable-end connectors.

As shown in FIGS. 13 to 15, the stabbing mechanism can further include first and second mating caps 100,100'. The first and second mating caps 100, 100' include engagement features for mutual engagement with each other when not engaged to a cable connector. When in the disengaged position, the mating caps 100, 100' are engaged with each other.

When the cable-end connector(s) 31 of the cable head system 24 is disengaged from the stab plate 92 of the hub, as shown in FIG. 14, the first mating cap 100 engages with the cable-end connector(s) 31 of the cable head system 24. The first mating cap 100 could have its electrical contacts connected to earth. The second mating cap 100' engages with the hub mounted cable connector(s) provided by the stab plate 92 of the stabbing mechanism. The second mating cap 100' is latched to the hub mounted cable connector(s) of the stab plate 92 and moves together with it as the stabbing mechanism is moved.

The first and second mating caps 100,100' replicate the real electrical connector and prevent marine growth and corrosion. The first and second mating caps 100, 100' are engaged with the corresponding cable-end connector(s) and/or hub-mounted connectors of the stab plate 92. The second cap 100' is engaged with the hub-mounted connector(s) so as to contain electrically isolated pins allowing the circuit to be energised at full working voltage.

The cable head system 24 provides a further recess 110 which is shaped and dimensioned to receive and/or engages the first and/or second mating caps 100, 100' when disengaged from the corresponding cable-end connector(s) 31 and/or hub-mounted cable connector(s).

The swing arm 82 comprises an engagement arm 102 for engaging the first mating cap 100. The engagement arm 102 is rotatable between a first position in which the engagement arm 102 aligns to engage with the first mating cap 100 when engaged with the corresponding connector and a second position in which the engagement arm 102 is rotated 180 degrees with respect to the first position such that the first mating cap 100 is displaced from alignment with the cable-end connector(s) 31.

The cable head system 24 may comprise a first mating cap 100 is engaged to the cable-end connector 31. The cable head system 24 comprises two spaced apart stop features 101 in the form of slots provided on the second surface of the cable head system 24 and arranged to engage the linear guides 88 of the stabbing mechanism of the hub. The second mating cap 100' may be engaged to the hub mounted connector(s) of the stab plate 92. The swing arm 82 is moved into an intermediate position in which the stab plate 92 is lowered and the hydraulic ram 94 of the stab plate assembly 86 moves the stab plate 92 in a linear direction towards the cable head system 24. The linear guides 88 are received within the spaced apart stop features 101. The stop features 101 are dimensioned to restrict the movement of the stab plate 92 in a linear direction towards the cable head system 24. The second mating cap 100' is received with the recess 110. The swing arm 82 is moved a bit further forward to be placed in the aligned position. The engagement arm 102 aligns with and engages with the first mating cap 100. The swing arm 82 is displaced away from the cable head system 24 in a direction extending substantially perpendicular to the second surface 32 of the cable head system 24 causing the engagement arm 102 to disengage the first mating cap 100 from the cable-end connector 31. Movement of the swing arm 82 in a direction extending substantially perpendicular to the second surface 32 of the cable head system 24 also causes the second mating cap 100' to disengage from the hub-mounted cable connector located on the stab plate 92 and be retained within recess 110.

The actuation mechanism rotates the engagement arm 102 by substantially 180 degrees with respect to an axis extending substantially perpendicular to the second surface 32 of the cable head system 24. The actuation mechanism then moves the stab plate 92 in a linear direction towards the cable head system 24 so as to align the stab plate 92 with the cable-end connector(s) provided by the cable head system 24. Movement of the stab plate 92 into alignment with the cable-end connector 31 also causes the first mating cap 100 to be aligned with the second mating cap 100' located within the recess 110 of the cable head system 24. The actuation mechanism then moves the stab plate 92 in a direction towards the cable-end connector 31 within the cable head system 24 so as to provide engagement between the stab plate 92 and the cable-end connector 31. This movement also moves the first mating cap 100 in a direction towards the second mating cap 100' causing the engagement features (not shown) of the first and second mating caps 100, 100' to mutually engage. When the cable-end connector(s) 31 of the cable head system 24 are engaged with the hub mounted cable connector(s) of the stab plate 92 of the hub, the first and second mating caps 100, 100' mutually engage and are retained within recess 110.

Although aspects of the invention have been described with reference to the embodiment shown in the accompanying drawings, it is to be understood that the invention is not limited to the precise embodiment shown and that various changes and modifications may be effected without further inventive skill and effort.

What is claimed is:

1. A subsea cable engagement system comprising:
   a cable head system comprising a cable end connector connected with a power generation unit;
   a hub comprising a hub mounted cable connector; and
   a base comprising:
      an engagement section engaging the hub; and
      an engagement member releasably engaging the cable head system;
   wherein the engagement member and the hub mounted cable connector are arranged to provide relative movement therebetween for releasable engagement of the hub mounted cable connector with the cable end connector when the cable head system is releasably engaged in the engagement member of the base.

2. The system of claim 1, further comprising an actuation mechanism arranged to provide relative movement between the engagement member of the base and the hub mounted cable connector.

3. The system of claim 2, wherein the actuation mechanism is supported by the hub and arranged to displace the hub mounted cable connector in a direction towards or away from the engagement member of the base.

4. The system of claim 3, wherein the actuation mechanism comprises a stab plate that carries the hub mounted cable connector.

5. The system of claim 4, wherein the actuation mechanism is arranged to rotate the stab plate relative to the hub.

6. The system of claim 5, wherein the actuation mechanism is arranged to displace the stab plate in a direction towards or away from the engagement member of the base.

7. The system of claim 2, wherein the engagement member comprises a plurality of engagement members, the hub mounted cable connector comprises a plurality of hub mounted connectors, the cable end connector comprises a plurality of cable end connectors, and the actuation mechanism comprises a plurality of actuation mechanisms, wherein the base comprises the plurality of engagement members provided in a first arrangement, wherein the plurality of hub mounted cable connectors are provided in a second arrangement, and wherein the first arrangement and the second arrangement are complementary such that on displacement by a respective one of the actuation mechanisms in an engaged position a respective one of the cable end connectors is mated with a respective one of the hub mounted cable connectors.

8. The system of claim 2, wherein the actuation mechanism comprises a stab plate that carries the hub mounted cable connector, and a stabbing mechanism moveable between an engaged position providing engagement between the hub mounted cable connector and the cable end connector of the cable head assembly when the cable head assembly is located within the engagement member of the base, and a disengaged position in which the cable end connector located within the engagement member of the base is disengaged from the hub mounted cable connector.

9. The system of claim 8, wherein in the engaged position the stable plate is located outboard of a vertical projection of the hub, and in the disengaged position the stable plate is located inboard of the vertical projection of the hub.

10. The system of claim 8, wherein the stabbing mechanism further provides a first functional cap for engaging the cable end connector located within the engagement member of the base.

11. The system of claim 10, wherein the stabbing mechanism further provides at least one a second functional cap for engaging the hub mounted cable connector.

12. The system of claim 10, wherein the stabbing mechanism is arranged to store the first functional cap and the second functional cap when the first functional cap and the second functional cap are disengaged from the cable end connector and the hub mounted cable connector, respectively.

13. The system of claim 11, wherein the first functional cap and the second functional cap comprise engagement features for mutual engagement with each other.

14. The system of claim 1, wherein the base further comprises at least one base alignment feature for alignment with at least one hub alignment feature provided by the hub.

15. The system of claim 1, wherein the engagement member of the base is located outboard of a vertical projection of the hub.

16. The system of claim 1, further comprising a flexible cable connected at a first end to the hub, and a second end of the flexible cable providing the hub mounted cable connector.

* * * * *